United States Patent

Israelson

[11] Patent Number: 5,507,318
[45] Date of Patent: Apr. 16, 1996

[54] UMBRELLA CHECK VALVES

[75] Inventor: Kevin L. Israelson, Gagetown, Mich.

[73] Assignee: Walbro Corporation, Cass City, Mich.

[21] Appl. No.: 317,576

[22] Filed: Oct. 4, 1994

[51] Int. Cl.⁶ .................................................. F16K 15/14
[52] U.S. Cl. .................................................. 137/854
[58] Field of Search .......................................... 137/854

[56] References Cited

U.S. PATENT DOCUMENTS

| | | | |
|---|---|---|---|
| 2,579,855 | 12/1951 | Pockel | 137/854 |
| 5,027,784 | 7/1991 | Osawa | 137/854 X |
| 5,067,449 | 11/1991 | Bonde | 137/854 X |

FOREIGN PATENT DOCUMENTS

| | | | |
|---|---|---|---|
| 2315870 | 10/1974 | Germany | 137/854 |
| 1088048 | 10/1967 | United Kingdom | 137/854 |

Primary Examiner—Robert G. Nilson
Attorney, Agent, or Firm—Barnes, Kisselle, Raisch, Choate, Whittemore & Hulbert

[57] ABSTRACT

An umbrella-type check valve and seat which prevents excessive deflection of the valve. The valve seat has a spherical surface that substantially conforms to the contour of the underside of the check valve. Preferably, a small gap is formed between the valve and the spherical surface seat to prevent preloading of the valve.

6 Claims, 1 Drawing Sheet

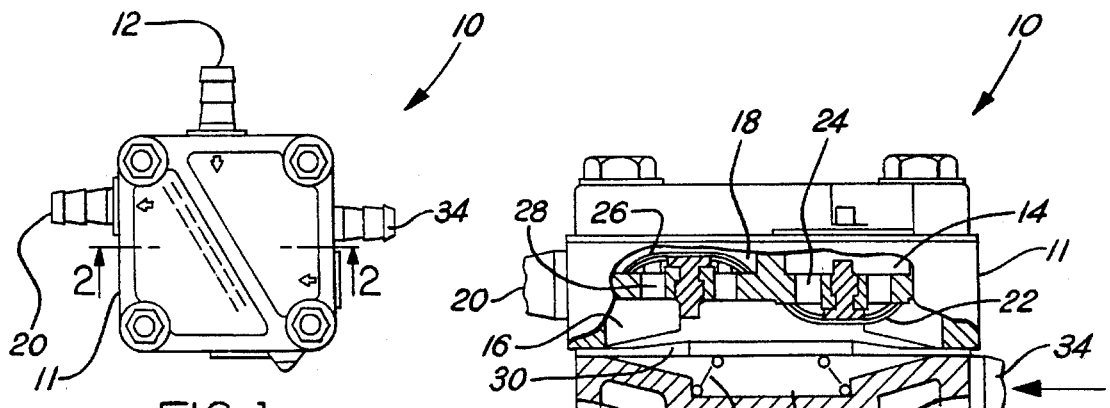
FIG. 1
FIG. 2
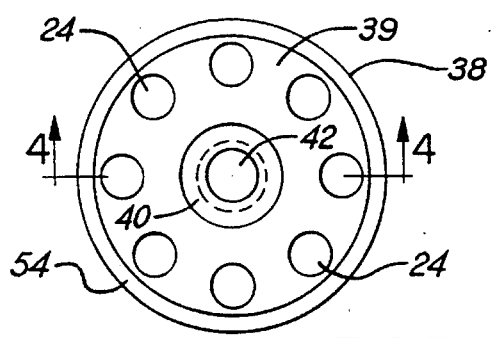
FIG. 3
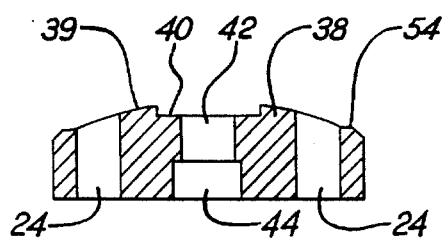
FIG. 4
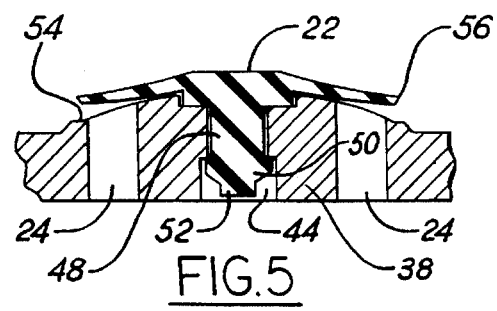
FIG. 5
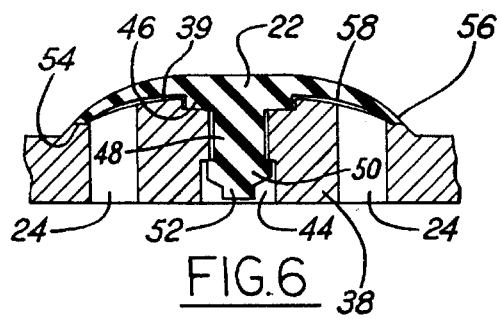
FIG. 6
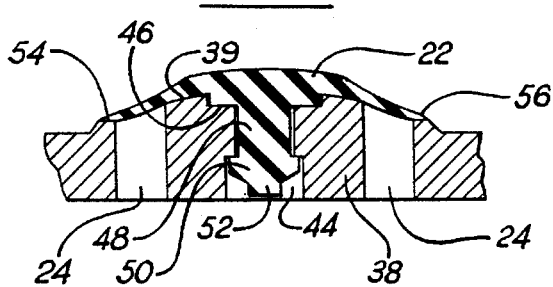
FIG. 7

5,507,318

UMBRELLA CHECK VALVES

FIELD OF INVENTION

This invention relates to an umbrella-type check valve typically used in a fuel pump and more particularly to a valve and seat construction that prevents excessive deflection of the check valve as it opens and closes.

BACKGROUND OF THE INVENTION

It is common to employ umbrella-type check valves in an impulse fuel pump typically used with conventional two-cycle internal combustion engines. During operation of such engines, variations in operating speed and throttle condition produce generally corresponding changes in the pressure of the gaseous components of the fuel and air mixture within a crankcase. It is understood, of course, that the crankcase chamber may be considered a pulse chamber associated with the engine and within which fluid pressure pulses are created in response to the reciprocating movement of the piston therein. It is thus generally known that fuel is supplied to the engine through the fuel pump in direct response to engine generated, positive and negative pressure conditions within the crankcase. The check valves in the fuel pump are responsive to the positive and negative pressure changes produced by the pressure pulses from the crankcase to open and close and thus control fuel flow to the engine.

Conventional umbrella-type check valves have a standard style seat consisting of a flat surface with one or more fuel flow ports. This standard seat design, together with the valve, forms a large unsupported volume of space and area underneath the valve. The volume of space allows the valve to flex down flat onto the seat when subjected to pressure. This excessive flexing causes cracking and tearing of the valve material which results in reduced pump life. Additionally, excessive deflection of the valve directly reduces the output of the pump since the pump diaphragm must displace the unproductive volume of space underneath the valve on each stroke of the piston.

SUMMARY OF THE INVENTION

An umbrella-type check valve and seat for a fuel pump is provided in which the seat has a spherical surface that substantially corresponds to the desired contour of the underside of the umbrella valve in its free state. The valve seat has a circular periphery within which fuel flow port or ports are formed extending through the valve seat. The valve seat further has a substantially planar or flat sealing surface located radially outwardly of the flow ports and extending circumferentially thereabout. The valve is secured to the valve seat in such a manner that the periphery of the umbrella valve rests on the sealing surface to cover the flow ports. The spherical valve seat is constructed and arranged so that there is virtually no wasted volume of space between the valve seat and the umbrella valve in its free state. This construction substantially eliminates unnecessary flexing of the valve.

Objects, features and advantages of this invention are to provide a valve seat for an umbrella-type check valve that has no substantial unproductive volume of space under the valve, that virtually eliminates excessive deflecting of the valve, that protects the valve from cracking and gearing, that increases output of the pump, has an increased useful life in service, and is simple, stable, rugged, durable, reliable, and is of relatively simple design and economical manufacture and assembly.

BRIEF DESCRIPTION OF THE DRAWINGS

These and other objects, features and advantages of this invention will be apparent from the following detailed description, appended claims and accompanying drawings in which:

FIG. 1 is a top view of a fuel pump embodying the present invention;

FIG. 2 is a partially broken away front view of the fuel pump;

FIG. 3 is a top view of the valve seat of the present invention;

FIG. 4 is a sectional view taken along line 4—4 in FIG. 3;

FIG. 5 is a sectional view of the valve seat similar to FIG. 4 with an umbrella valve in a flexed open position;

FIG. 6 is a sectional view similar to FIG. 5 with the umbrella valve in an unflexed free state; and FIG. 7 is a sectional view similar to FIG. 5 with the umbrella valve in a flexed closed position.

DETAILED DESCRIPTION

Referring in more detail to the drawings, FIGS. 1 and 2 illustrate a typical impulse fuel pump 10 within which valves and seats of the present invention may be used. The fuel pump 10 comprises body 11 having a fuel inlet 12 leading to an inlet chamber 14, a fuel chamber 16, and an outlet chamber 18 having a fuel outlet; 20. A check valve 22 acts to admit fuel from inlet chamber 14 to fuel chamber 16 through flow ports 24. Likewise, a check valve 26 acts to admit fuel from fuel chamber 16 to outlet chamber 18 through flow ports 28. A diaphragm 30 separates fuel chamber 16 from an impulse gas chamber 32 that is subjected to pressure pulses from an engine crankcase (not shown) through gas inlet 34. The negative pressure pulses flex diaphragm 30 against a spring 36 to decrease the pressure in fuel chamber 16. Positive pressure pulses and spring 36 act oppositely on diaphragm 30 to increase pressure in fuel chamber 16. Thus, it can be readily understood that decreased pressure in fuel chamber 16 opens check valve 22 to displace fuel from inlet chamber 14 into fuel chamber 16 through flow ports 24. Alternatively, increased pressure in fuel chamber 16 opens check valve 26 to displace fuel from fuel chamber 16 to outlet chamber 18 through flow ports 28.

The fuel pump 10 may be used on either two-stroke or four-stroke engines. In both types of engines, sub-ambient and super-ambient pressure pulses are created in the crankcase. Four-stroke engines create much more sub-ambient pressure than super-ambient pressure. Therefore, when the fuel pump 10 is used with a four-stroke engine, use of the spring 36 is necessary in order to assist the low super-ambient pressure to induce pulsation of the diaphragm. It is to be understood, however, that spring 36 may be eliminated if there is sufficient super-ambient pressure from the crankcase to induce pulsations of diaphragm 30, for example, when a two-stroke engine is employed.

In accordance with this invention, improved umbrella type valves and seats 22 and 26 may be utilized in the pump. Since each valve and seat has the same construction, only one valve seat 38 will be described in connection with umbrella valve 22. As seen most clearly in FIG. 6, the valve seat 38 has a flat inlet and a spherical radius portion 39 at an outlet side that substantially matches the contour of the underside of the umbrella valve 22. The valve seat may be used with a variety of sizes of valves ranging from about 0.2" in diameter to 1.6" in diameter. These valves may have a radius of curvature typically ranging from about 2" to 6" and preferably about 3" to 5".

For retaining the valve, the seat 38 has a centrally located recess 40, a hole 42 and a counterbore 44. The valve 22 has a complementary central standoff portion 46, a valve stem 48 extending therefrom, a canted retaining knob 50, and a pilot 52. The pilot 52 is generally about 1 ½ inches long before installation. It is placed through the hole 42 to extend through the counterbore 44. The pilot 52 is then grasped and pulled until the retaining knob 50 snaps into the counterbore 44 and the standoff portion 46 seats within recess 40 of the valve seat. Most of the pilot is then trimmed or cut off as seen most clearly in FIGS. 5–7. The plurality of flow ports 24 is formed preferably equidistant about the periphery of the spherical radius portion 39. A flat or planar annular seat portion 54 is formed about the periphery of the spherical radius portion 39 upon which the outer edge 56 of the umbrella valve 40 seats to cover the flow ports 24. As best seen in FIG. 6, preferably a small gap 58 exists between the umbrella valve 22 and the spherical radius portion 39 when the system is at rest with no pressure differential across the valve. The gap 58 is created to prevent preloading of the valve 22, to allow limited flexing, and to reduce the pressure required to open the valve.

Operation of the valve 22 can best be seen in FIGS. 2 and 5–7. The system is shown at rest in FIGS. 2 and 6 where the outer edge 56 of the valve 22 bears on the seat portion 54 of the valve seat 38. Once the engine is started, reciprocation of the piston creates positive and negative pressure pulses within the crankcase which are transmitted through the gas inlet 34 to the impulse chamber 32. When negative pressure is present in the impulse chamber 32, the diaphragm 30 is flexed against the spring 36. This creates a reduced pressure in the fuel chamber 16 lifting the periphery 56 of the valve 22 from the seat 54 (FIG. 5) to allow fuel flow through ports 24 into the fuel chamber 16. Simultaneously, the reduced pressure in the fuel chamber 16 causes valve 26 to flex against the valve seat (FIG. 7) to seal flow ports 28.

As the diaphragm 30 moves in the opposite direction under the influence of the spring 36 plus the positive pressure pulses from the crankcase, the pressure increases in fuel chamber 26. This causes the valve 22 to close (FIG. 7) and valve 26 to open (FIG. 5) to allow fuel to flow from the chamber 16 into the outlet chamber 18 and out through the outlet 20.

The valve seat 38 provides a stable securement and support for the flexible valve allowing the valve to open and close without undue flexing. This is achieved by substantially eliminating unproductive space underneath the valve. Increased output of the pump is also achieved because the valve no longer must displace the unproductive volume of space underneath the valve.

What is claimed:

1. A valve for use in an impulse fuel pump to supply fuel to an engine, said valve comprising:

a body having an input side, an output side and a plurality of ports extending through said body, a flexible membrane having an upper side, a lower side, a peripheral edge, and a generally semi-spherical cross-section, said membrane being disposed on the output side of said body, carried by said body and responsive to fluid pressure to close and open to control the flow of fluid through said plurality of ports, a spherical surface having a periphery on said body at the output side thereof through which said plurality of ports extend forming a valve support surface that substantially corresponds in shape to the lower side of said membrane, and a generally flat seating surface on said body for engagement with the periphery of said membrane to close said ports, said body and said membrane being constructed and arranged such that when said valve is not subjected to fluid pressure, the periphery of said membrane engages said seating surface and leaves a small gap between the lower side of said membrane and said spherical surface on said body to eliminate overflexing of said spherical membrane.

2. The valve of claim 1 wherein said spherical surface has a radius of between 0.2" to 1.6".

3. The valve of claim 1 wherein said seating surface extends about the periphery of said spherical surface.

4. The valve of claim 3 wherein said plurality of ports is located equidistant about the periphery of said spherical surface.

5. The valve of claim 3 wherein the lower side of said membrane contacts said spherical surface when the lower side is subjected to negative pressure to prevent fluid from flowing through said plurality of ports.

6. The valve of claim 1 wherein said membrane has a radius of between 2" to 6".

* * * * *